Jan. 6, 1959   F. S. LEBIEDZINSKI   2,867,055
EARTHWORM TRAP AND BREEDING BOX
Filed Aug. 23, 1957
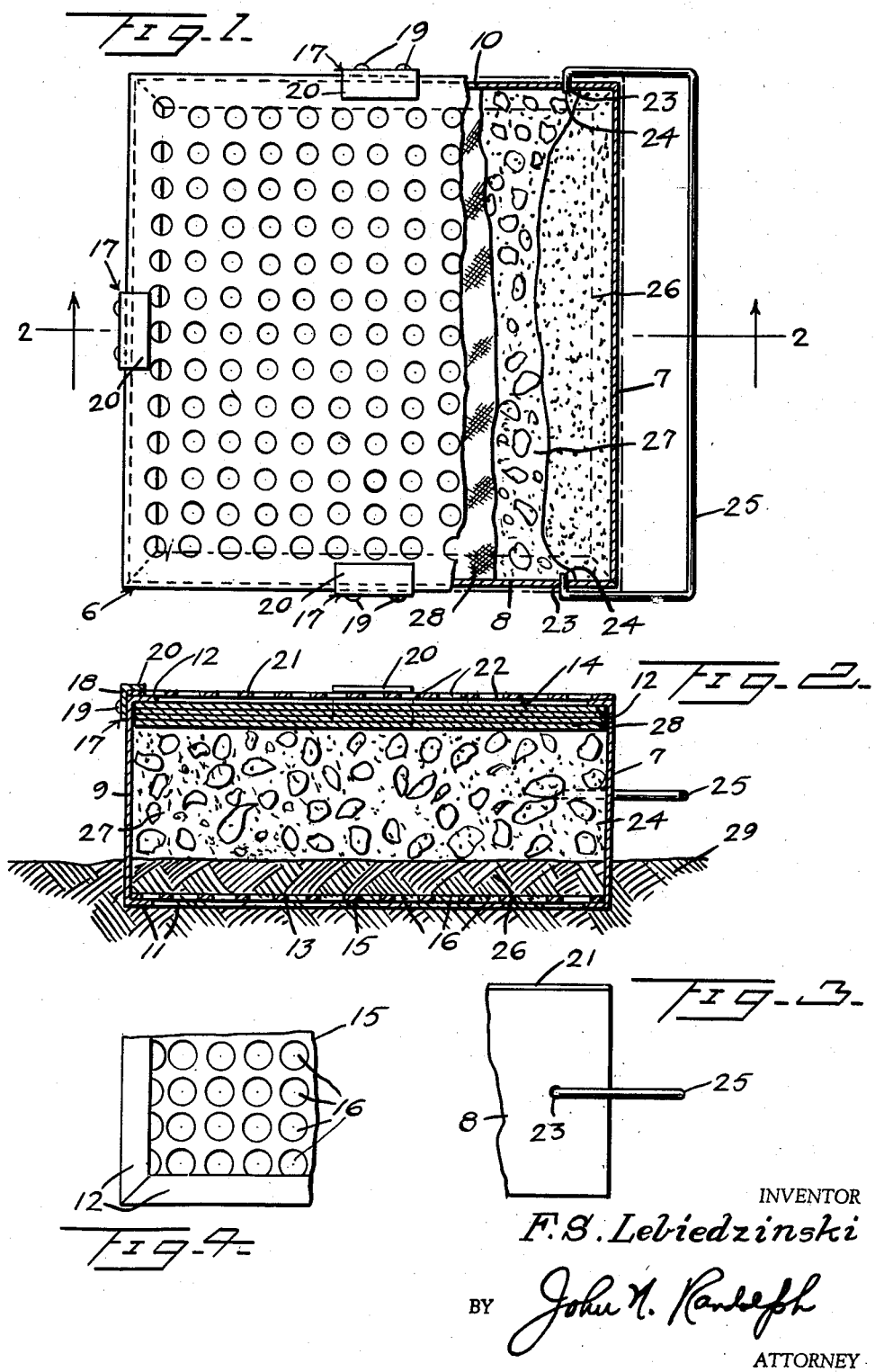
INVENTOR
F. S. Lebiedzinski
BY John N. Randolph
ATTORNEY

United States Patent Office 2,867,055
Patented Jan. 6, 1959

2,867,055

EARTHWORM TRAP AND BREEDING BOX

Frank S. Lebiedzinski, Hatboro, Pa.

Application August 23, 1957, Serial No. 679,908

6 Claims. (Cl. 43—55)

This invention relates to a novel container adapted to be placed upon or partially embedded in the earth and containing materials for attracting earthworms thereto.

More particularly, it is an aim of the present invention to provide a container having a perforated part which is in contact with the earth, the perforations of which are of sufficient size so that earthworms may pass therethrough from the earth into the container.

Another object of the invention is to provide a container including a layer of soil disposed in contact with the perforated earth engaging part of the container and whereby the soil will substantially fill the perforations of said part so that no air spaces will exist which would tend to discourage movement of earthworms from the earth through the perforations into the container.

A further object of the invention is to provide a container which is adapted to be partially filled with organic materials of a character which will decompose rapidly to provide food for earthworms and which will cause earthworms to be attracted into the container and remain there to breed.

A further object of the invention is to provide a container having means whereby the contents thereof may be readily maintained in a moist condition attractive to earthworms.

Still another object of the invention is to provide an earthworm trap and breeding container which may be readily opened for removing earthworms therefrom.

Various other objects and advantages of the invention will hereinafter become more fully apparent from the following description of the drawing, illustrating a presently preferred embodiment thereof, and wherein:

Figure 1 is a top plan view, partially broken away and partially in section;

Figure 2 is a vertical sectional view of the breeding box and trap taken substantially along a plane as indicated by the line 2—2 of Figure 1;

Figure 3 is a fragmentary side elevational view of a portion of the container or box, and Figure 4 is a fragmentary plan view of a corner of the box with the cover thereof removed.

Referring more specifically to the drawing, the earthworm trap and breeding box in its entirety is designated generally 6 and includes four walls 7, 8, 9 and 10 which are joined together in any conventional manner at the corners of the box 6. Each of said walls is provided with an inwardly extending bottom flange 11 and an inwardly extending top flange 12. The flanges 11 are relatively narrow and are disposed coplanar to provide a large opening 13 in the bottom of the box 6 and the flanges 12 are similarly relatively narrow and disposed coplanar to provide a large opening 14 in the top of the box.

The box 6 includes a bottom 15 the marginal edge portions of which rest on and are supported by the flanges 11 for maintaining the bottom 15 within the box 6. The bottom 15 is provided with a plurality of openings 16 which communicate with the bottom opening 13.

Three of the side walls, as for example the walls 8, 9 and 10, are provided with angular keeper members 17 each including a vertical flange 18 which is secured to the outer side of the upper portion of the wall thereof by fastenings 19, and a substantially horizontal inwardly extending top flange 20 which overlies and is spaced from the top flange 12 of said wall.

The box 6 also includes a removable top wall or cover 21 of a size to cover the top opening 14 of the box and which rests upon the top flanges 12 and which has portions thereof disposed beneath the keeper flanges 20, when the top wall or cover 21 is in a closed position, as illustrated in Figures 1 and 2. The oppositely disposed keepers 17, as seen in Figure 1, slidably guide the cover 21 in its movement onto and off of the open top of the box 6 and the other keeper 17, which is supported by the wall 9, limits movement of the cover 21 toward a closed position. As the wall 7, opposite the wall 9, is not provided with a keeper 17, it will be readily apparent that the cover 21 may be slid toward said wall 7 and away from the keeper 17 of the wall 9 for removing the cover 21 to expose the top opening 14 of the box. The top wall 21 is also provided with a plurality of openings 22 which communicate with the open top 14 of the box and which may be and preferably are smaller than the bottom openings 16.

Two oppositely disposed side walls, such as the walls 8 and 10, are provided with aligned openings 23 located, for example, adjacent the wall 7 for receiving the inturned ends 24 of a bail-type handle 25 which is normally disposed outwardly with respect to the wall 7, as seen in Figures 1 to 3. Except for the openings 23, the walls 7, 8, 9 and 10 are imperforate.

For use, the box 6 may be placed with the bottom flanges 11 resting upon the earth. However, it is preferable that the bottom portion of the box 6 be slightly embedded in the earth 29, as illustrated in Figure 2. The bottom 15 supports a thin layer of soil 26 within the box 6 and which may be of a thickness of approximately one inch. After the soil 26 has been placed in the box and thoroughly moistened, a thicker layer 27 of organic materials is applied to the box 6 above the soil layer 26. The layer 27 is preferably composed of vegetable material or materials which will quickly decompose, such as certain kitchen scraps, pulverized leaves, grass clippings, coffee grounds, corn meal, and manure. Materials which will decompose rapidly are preferred since worms will not feed on anything still possessing life. The layer 27 is substantially thicker than the soil layer 26 and after being applied to the box 6 is thoroughly moistened. The top portion of the box 6 is then filled with burlap 28 which overlies the food layer 27, to maintain the moisture in the layers 26 and 27. The cover 21 is then applied.

The box 6 is preferably placed in level ground so that a water puddle will not accumulate therearound. Water can be added through the perforations 22 in the cover 21 about once a week where an insufficient amount of rain water has been supplied to the box 6 through the openings 22. The openings 22 in addition to affording means for moistening the soil layer 26 and the layer of food material 27, additionally permit a circulation of air to and from the box 6 to maintain the box relatively cool. A few earthworms may be placed in the box initially to speed up the entrance of worms into the box and the breeding of the worms therein. However, this is not essential.

The bottom wall openings 16 are of sufficient size so that some of the soil 26 will seep therethrough and contact the earth 29 in which the bottom portion of the box 6 is embedded. Thus, no air space will exist between the earth 29 and the soil layer 26, as seen in Figure 2, so that worms will pass readily upwardly from the earth 29 through the openings 16 into the box 6. The large available supply of food 27 in the box 6 will cause the worms to remain in said box and will promote breeding.

To remove worms from the box 6, the cover 21 is slidably removed and the burlap 28 is lifted so that the material 27 can be gently stirred to expose the worms. After removal of as many of the worms as desired, the burlap 28 is replaced over the food layer 27 and the cover 21 is then re-applied.

Various modifications and changes are contemplated and may be resorted to, without departing from the function or scope of the invention as hereinafter defined by the appended claims.

I claim as my invention:

1. An earthworm trap and breeding box comprising a container including imperforated side walls, a perforated bottom and a perforated top, a layer of soil disposed in the bottom portion of the container, and a layer of a material forming a worm food disposed in said container above the soil layer for attracting worms into the container through the perforations of the bottom, said perforated bottom being adapted to be disposed in contact with the earth whereby worms may pass upwardly through said bottom perforations into the soil layer of the container.

2. An earthworm trap and breeding box as in claim 1, said perforated top forming a cover and the perforations thereof permitting a circulation of air to and from the contents of the box and permitting watering the contents of the box, and keeper members connected externally to three of the side walls and having horizontal top portions disposed above and spaced from said walls and overlying portions of the cover for slidably mounting the cover on the upper portions of the side walls.

3. An earthworm trap and breeding box as in claim 1, and a covering of moisture retaining fabric disposed in the upper portion of the container between the food layer and said perforated top wall.

4. An earthworm trap and breeding box as in claim 1, the bottom portion of the box being adapted to be embedded in the earth, the perforations of said box or container being sufficiently large to permit a part of the soil to fill said perforations and contact the earth disposed therebeneath.

5. An earthworm trap and breeding box as in claim 1, said side walls having coplanar inturned bottom flanges on which marginal portions of the perforated bottom rest for supporting said bottom within the container, and said side walls having inturned coplanar top flanges on which the top wall is supported, said top wall comprising a removable cover.

6. An earthworm trap and breeding box as in claim 1, and a bail-type handle having aligned inturned terminals extending inwardly through openings in two oppositely disposed side walls of the container and adjacent a third side wall thereof for swingably mounting an intermediate portion of the handle outwardly with respect to said third side wall.

No references cited.